United States Patent Office 2,818,533
Patented Dec. 31, 1957

2,818,533

ELECTRICAL CIRCUITS EMPLOYING DISCHARGE TUBES

David Lorimer Smart and John James Lawrence Weaver, Stafford, England, assignors to The English Electric Company Limited, London, England, a British company Application January 28, 1954, Serial No. 406,846

Claims priority, application Great Britain February 10, 1953

3 Claims. (Cl. 315—260)

This invention relates to a converter for producing, from a polyphase alternating current input, an alternating current output of relatively high frequency, and employing for each phase of the polyphase input a pair of vapour discharge paths connected to conduct in the same direction in parallel current paths between a pair of terminals for that phase excited with an alternating voltage of the input frequency, said vapour discharge paths having control grids excited in antiphase to each other with an alternating firing voltage at the output frequency, so as to render the discharge paths conductive alternately at this output frequency during a desired firing period of the input frequency cycle, which desired period covers at least part of that period of the input frequency cycle during which the corresponding phase input terminal is more positive than any of the other phase input terminals. Such a converter is herein called a "converter of the kind described."

The term "polyphase" is used herein to include "biphase," that is to say, an input of two alternating currents displaced in phase from each other by 180°.

A converter of the kind described, according to the invention, is provided with means to keep the potentials of the control grids down to a hold-off value during the desired non-firing period of the input frequency cycle, and to apply to the control grids, in anti-phase with each other, throughout the desired firing period of the input frequency cycle, an alternating firing voltage of the desired output frequency, the application of said alternating firing voltage being made to the two grids suddenly and substantially simultaneously at the instant in the input frequency cycle when the desired firing period is to begin, and means being provided to vary the instant in the input frequency cycle at which this application is made so as to vary the output power of the converter.

The expression "suddenly and substantially simultaneously" is used to mean that the applications of the alternating firing voltage to the two grids are both made within a total interval not exceeding half a cycle of the output frequency so as to ensure that if one of the discharge paths fires in one half cycle of the output frequency then the other discharge path of the pair will nearly always fire in the next half cycle thereof.

Figure 1:
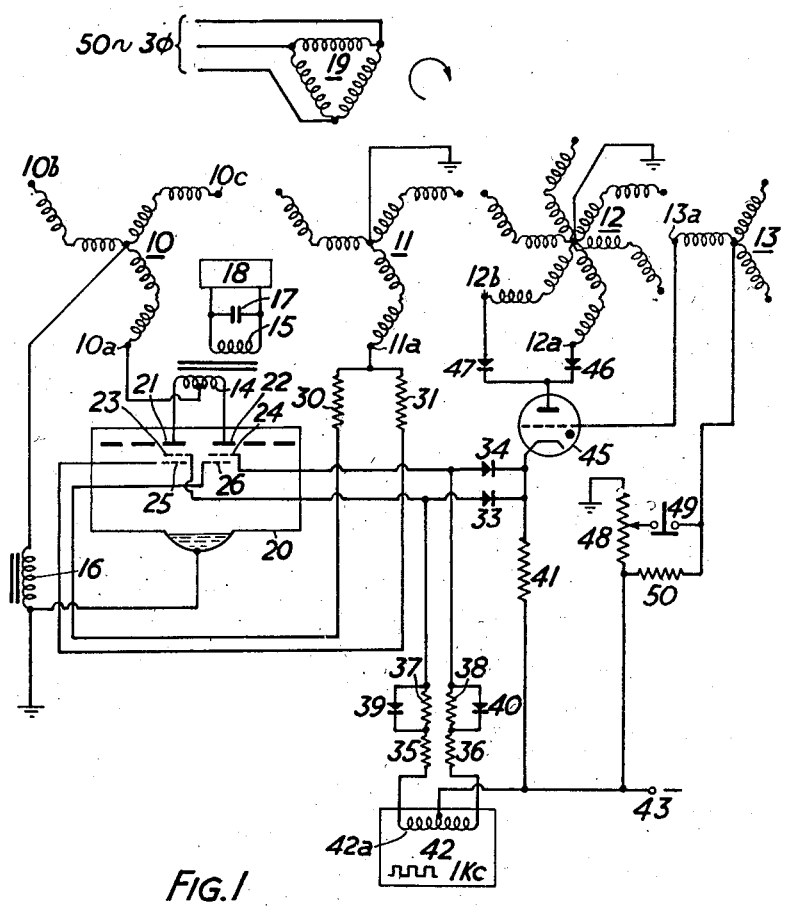
Figure 2:
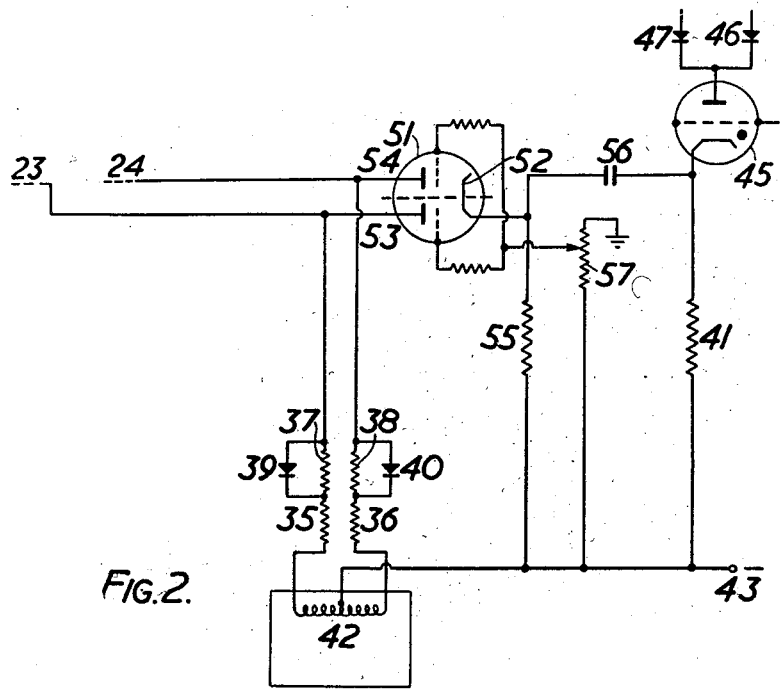

In the accompanying drawings Fig. 1 shows diagrammatically the circuit arrangements corresponding to one phase of an apparatus which embodies the invention in preferred form. This apparatus serves as a frequency changer for producing a single phase alternating electrical output of high frequency from a three-phase alternating electrical input of mains frequency. Fig. 2 shows fragmentarily a detail modification of the circuit arrangement shown in Fig. 1.

In the arrangement shown in Fig. 1, the secondary windings 10, 11, 12 and 13 are all mounted upon the core of a three-phase transformer having a primary winding 19 connected to a 50-cycle three-phase mains supply.

One phase terminal 10a of the secondary winding 10 is connected to the mid point of a primary winding 14 on an output transformer which also carries corresponding primary windings (not shown) similarly connected to the other phase terminals 10b, 10c. A single secondary winding 15 on this output transformer passes energy at an output frequency of, say, one kilocycle per second to a load 18 having a parallel capacitor 17.

The extremities of winding 14 are connected to one pair of anodes 21, 22 of a six-anode pool-cathode mercury vapour discharge tube 20. The cathode is connected directly to earth and also through a choke 16 to the neutral point of secondary winding 10.

In the discharge path to each anode two grids are provided, but only those in the discharge paths to anodes 21 and 22 are diagrammatically shown. Of these, the grids 23 and 24, nearer to the anodes, are operated as control grids by being impressed in anti-phase with each other with alternating firing voltage of the desired output frequency; whereas the grids 25 and 26, more remote from the anodes, are impressed with alternating voltage at input frequency.

The alternating voltage of input frequency for impression upon grids 25 and 26 is derived from phase terminal 11a of secondary winding 11 through grid resistors 30 and 31. The neutral point of secondary winding 11 is directly connected to earth and so to the cathode of tube 20. The voltage of terminal 11a is in phase with that of terminal 10a.

The alternating voltage for the control grids 23 and 24 is derived from a square wave generator 42 which is operated at the desired output frequency indicated as one kilocycle per second. The grids are connected to the extremities of the output winding 42a of generator 42 through grid resistors 37—35 and 38—36. The square wave voltage developed in the output winding 42a is of the order of 300 to 500 peak volts between each extremity and the mid point. This mid point is connected to a terminal 43 which is a source of bias of the order of 100 to 200 volts negative to earth.

In order to provide a low impedance path for the pulses of reverse grid current which are repeated at output frequency at instants following initiation of each firing pulse, metal rectifiers 39 and 40 are arranged to by-pass resistors 37 and 38, leaving only resistors 35 and 36 in circuit. The values of the latter resistors may be of the order of 5,000 ohms each, whereas those of resistors 37 and 38 may be of the order of 15,000 ohms each.

For the purpose of preventing firing of the anodes 21 and 22 during periods of the input frequency cycle in which such firing is not desired, the potentials of control grids 23 and 24 are clamped down below their hold-off value by connection through metal rectifiers 33 and 34 and through resistor 41 to negative bias terminal 43. Resistor 41 may have a value of the order of 2,500 ohms; it is shown as purely resistive, but an inductive impedance may be used.

To release this negative clamping during periods of the input frequency cycle when firing of anodes 21 and 22 is required, unidirectional current is passed through resistor 41 from the cathode of a thyratron 45 to terminal 43, the value of this current being such as to bring the potential of the cathode of thyratron 45, and hence the bias potential applied to control grids 23 and 24, up to about 50 or 100 volts positive to earth during such periods. When firing of thyratron 45 is initiated, the negative clamping of the potentials of control grids 23 and 24 is released suddenly; and as a single clamping circuit is employed for both of them, the interval between the instants at which the clamping is released for the two control grids does not exceed a few microseconds.

The anode of the thyratron 45 is connected through rectifiers 46 and 47 to two adjacent phase terminals 12a, 12b of six-phase secondary winding 12. These two terminals are selected for their voltages to be respectively in phase with and 60° retarded relative to that of input phase terminal 10a which supplies anodes 21 and 22, so that a voltage which is positive relative to negative terminal 43 is applied to the anode of thyratron 45 over a period of the input frequency cycle which straddles the range of possible firing periods for anodes 21 and 22.

The instant at which firing of thyratron 45 is initiated in each input frequency cycle, is controlled by the impression upon its grid of a negative bias voltage derived from potentiometer 48, through relay contacts 49 (assumed to be closed), superposed upon a sine wave voltage derived from one phase terminal 13a of the three-phase secondary winding 13. This terminal is selected for its voltage to lag 90 degrees in phase behind that of terminal 12a which is the earlier in phase of the two voltages from secondary winding 12 which feed the anode of thyratron 45. By variation of the setting of potentiometer 48, the instant of initiation of firing of thyratron 45 may be delayed to any desired point in the earlier part of that period of the input frequency cycle during which the anode of this thyratron is positive to its cathode, and thus the high frequency output power of the converter may be controlled.

With the circuit described, the square wave voltage of desired output frequency which is applied from generator 42 to control grids 23 and 24 is controlled so that these grids will never become sufficiently positive to permit firing to their corresponding anodes until the instant in the input frequency cycle when thyratron 45 is fired. The potentials of these control grids 23 and 24 will thereafter, however, successively be made sufficiently positive during each output frequency cycle to permit alternate firing of anodes 21 and 22, until a point in the input frequency cycle is reached at which the pair of anodes of the discharge tube 20 connected to the next phase terminal 10b of secondary winding 10, having already become sufficiently positive, are permitted (by their thyratron corresponding to thyratron 45) to start firing. At about the same instant in the input frequency cycle when this change takes place, or shortly afterwards, the anode of thyratron 45 will cease to be sufficiently positive to maintain firing; and the unidirectional current through resistor 41 will therefore cease, so that the potentials of the control grids 23 and 24 will be again clamped below their hold-off value. This greatly reduces the danger of irregular firing; and such danger is further reduced by the fact that the lower grids 25 and 26 are going negative at this part of the input frequency cycle.

It has been assumed that relay contacts 49 are closed. When output power is not required, however, these contacts are opened, so that the grid of thyratron 45 is biased through a resistor 50 (of high value relative to potentiometer 48) to a cut-off condition. When output power is wanted, means (not shown) are put into operation to open and close repeatedly, at intervals of a few milliseconds, the relay contacts 49 until output frequency voltage builds up in the output circuit, and thereafter to hold these relay contacts closed until a "stop" button is operated to open them and again to bias the thyratron 45 to cut-off. The means for operating relay contacts 49 may be similar to those disclosed in patent application Serial No. 247,702.

Further means (not shown) may be provided to vary the voltage across potentiometer 48 automatically in response to the current or voltage appearing across load 18, thereby varying the firing point of thyratron 45 in the input frequency cycle in appropriate sense tending to reduce such current or voltage variations.

Fig. 2 shows a manner in which triodes may be substituted in place of the metal rectifiers 33 and 34 of Fig. 1. A double triode tube 51 is used, having its anodes 53 and 54 connected to the control grids 23 and 24 of the discharge tube 20. The common cathode 52 of this double triode tube 51 is connected to the negative bias terminal 43 through a resistor 55 of the same order of value as resistor 41, and is also coupled to the cathode of thyratron 45 through a large capacitor 56.

The control grids of the triodes are biased from a potentiometer 57 connected between terminal 43 and earth. When thyratron 45 is non-conducting this bias holds the grids of the triodes positive with respect to the common cathode 52, and control grids 23 and 24 of the discharge tube are thus clamped through resistor 55 to the negative bias terminal 43.

When thyratron 45 is rendered conductive, the rise of potential of its cathode is applied through capacitor 56 to the common cathode 52 of the triodes while their grids remain biased from potentiometer 57. The triodes are thus cut off and the negative clamping is removed from control grids 23 and 24 of the discharge tube. The time constant of the combination of capacitor 56 and resistor 55 is made sufficiently large for this condition to subsist throughout the firing period of thyratron 45.

What we claim as our invention and desire to secure by Letters Patent is:

1. A converter of the kind described provided with unidirectional conductors directly connecting to a common point each of the control grids for a pair of vapour discharge paths, and provided with means operative at input frequency to hold said common point at a hold-off bias potential for the control grids during a part of every input frequency cycle and at a firing bias potential for the control grids during another part of every input frequency cycle.

2. A converter of the kind described provided with unidirectional conductors directly connecting to a common point each of the control grids for a pair of vapour discharge paths, a source of hold-off bias potential for the control grids, an impedance connecting said common point to said source, and means to pass unidirectional current from said common point through said impedance during a part of every input frequency cycle to raise the potential of said common point to a firing bias potential.

3. A converter according to claim 2 wherein said means to pass direct current from said common point through said impedance comprises a thyratron having its output circuit including said impedance and having its output circuit and its grid circuit excited at the input frequency of the converter.

References Cited in the file of this patent

UNITED STATES PATENTS

| 2,132,839 | Widmer et al. | Oct. 11, 1938 |
| 2,250,202 | Matustia | July 22, 1941 |
| 2,361,169 | Bivens | Oct. 24, 1944 |
| 2,373,545 | Cooper | Apr. 10, 1945 |
| 2,404,643 | Livingston | July 23, 1946 |
| 2,587,151 | Hansen | Feb. 26, 1952 |